United States Patent [19]

Harris et al.

[11] Patent Number: 4,593,388
[45] Date of Patent: Jun. 3, 1986

[54] SIGNAL PROCESSORS FOR DIGITAL TELEPHONE EXCHANGES

[75] Inventors: William G. Harris, Leicestershire; Stuart J. Mason, Nottinghamshire, both of England

[73] Assignee: Plessey Overseas Limited, Essex, England

[21] Appl. No.: 524,323

[22] Filed: Aug. 18, 1983

Related U.S. Application Data

[63] Continuation-in-part of Ser. No. 236,213, Feb. 19, 1981, abandoned.

[30] Foreign Application Priority Data

Feb. 20, 1980 [GB] United Kingdom ............ 8005726

[51] Int. Cl.$^4$ .................. H04Q 3/545; H04Q 11/04
[52] U.S. Cl. ............................. 370/67; 179/18 ES
[58] Field of Search ............. 370/67, 66, 62, 58; 179/18 ES

[56] References Cited

U.S. PATENT DOCUMENTS

| Re. 31,651 | 8/1984 | Alles | 370/66 |
|---|---|---|---|
| 4,187,399 | 2/1980 | Maxfield et al. | 370/67 X |
| 4,213,201 | 7/1980 | Gagnier et al. | 370/62 |
| 4,276,451 | 6/1981 | Beebe et al. | 179/175.2 C |
| 4,288,658 | 9/1981 | Bieber et al. | 178/3 |
| 4,389,720 | 6/1983 | Baxter et al. | 370/62 |

OTHER PUBLICATIONS

"An Experimental Digital Switching System", G. Perucca, Intern'l. Switching Symposium, Munich, Sep. 1974, pp. 227/1-8.
"NEAX 12/22 EPBX Series", Enomoto et al., Intern'l. Switching Symposium, Paris, May, 1979, pp. 163-170.
"The Development and Field Introduction of a Digital Multiplex Switching System Family", Kenedi et al., Intern'l. Switching Symposium, Paris, May 1979, pp. 387-394.

Primary Examiner—Thomas W. Brown
Attorney, Agent, or Firm—Fleit, Jacobson, Cohn & Price

[57] ABSTRACT

A digital telephone exchange including a first and second processor in which the second processor contains algorithms selectable by the first processor for operation of functions within the exchange, and in which subscribers' apparatus is connectable to both processors via bus structures and in which signals are passed along the bus structures between connected subscribers under the command of both processors.

4 Claims, 20 Drawing Figures

SIGNAL PROCESSORS FOR DIGITAL TELEPHONE EXCHANGES

BACKGROUND

This is a continuation-in-part of U.S. patent application Ser. No. 236,213, filed Feb. 19, 1981, now abandoned.

The present invention relates to telecommunications exchanges and more particularly to the processing of control signals in digital telecommunications exchanges.

In a known digital PABX exchange such as described in "International Conference on Private Electronic Switching Systems," 10th–12th April 1978, IEEE, (London, United Kingdom), D. A. T. Rayfield et al. "The Plessey PDX, a new digital PABX," pages 211–214, the signal processing equipment in the common control area comprises a number of separate units. Typically these are multi-frequency register, conference bridges, rotary registers, rotary senders and tone generators. A number of multi-frequency registers are required depending on the size of the exchange and each of the other circuits requires duplication for security. Each unit is mounted on a printed wiring board assembly and therefore in a typical exchange with seven multi-frequency registers a total of fifteen such printed wiring board assemblies together with associated rack space and interconnections are required.

It is also known in telecommunications to use microprocessors to perform various functions under their own control without reference to a main central processing unit—see for example U.S. Pat. No. 4,112,258.

OBJECT AND SUMMARY

It is an object of the present invention to utilize a microprocessor in a specified connection arrangement to enable exchange control functions to be performed. The arrangement in particular is extremely flexible in that it enables the microprocessor to be addressed or to address the main central processing unit and for either the main central processing unit or the microprocessor to control the passage of data or signalling information to and from the subscribers or other peripheral units.

To meet the above-mentioned object, the present invention provides a digital telephone exchange which has a central processing unit and a signal pre-processor inter-connected by a data bus. Subscribers' apparatus is connected to the data and additionally to a time division multiplex system which is divided into a command bus and a data bus. A time division multiplex network controller is connected to the processor data bus and the time division multiplex highway system and is arranged to store both source and destination addresses for data transferred by the data bus, the addresses being generated by the central processing unit and input to the command bus of the time division muliplex highway system.

The central processing unit has a memory in which a number of tasks are recorded, the tasks performing functions such as interrogating subscribers' apparatus and allotting a time slot to the signal pre-processor for operation on signals from a subscriber connected to the subscribers' apparatus. Algorithms for performing the tasks allotted by the central processing unit are held in a memory of the pre-processor. The algorithms consist of a number of words which the signal pre-processor operates on in a single time division multiplex frame period.

The construction of a digital telephone exchange in which the signal pre-processor comprises a microprocessor responsive to a program memory and using other memories for storage and manipulation of data will be apparent from the following full description of such an exchange.

BRIEF DESCRIPTION OF THE DRAWINGS

Embodiments of the present invention will now be described, by way of example with reference to the accompanying drawings.

DETAILED DESCRIPTION

Figure 1:
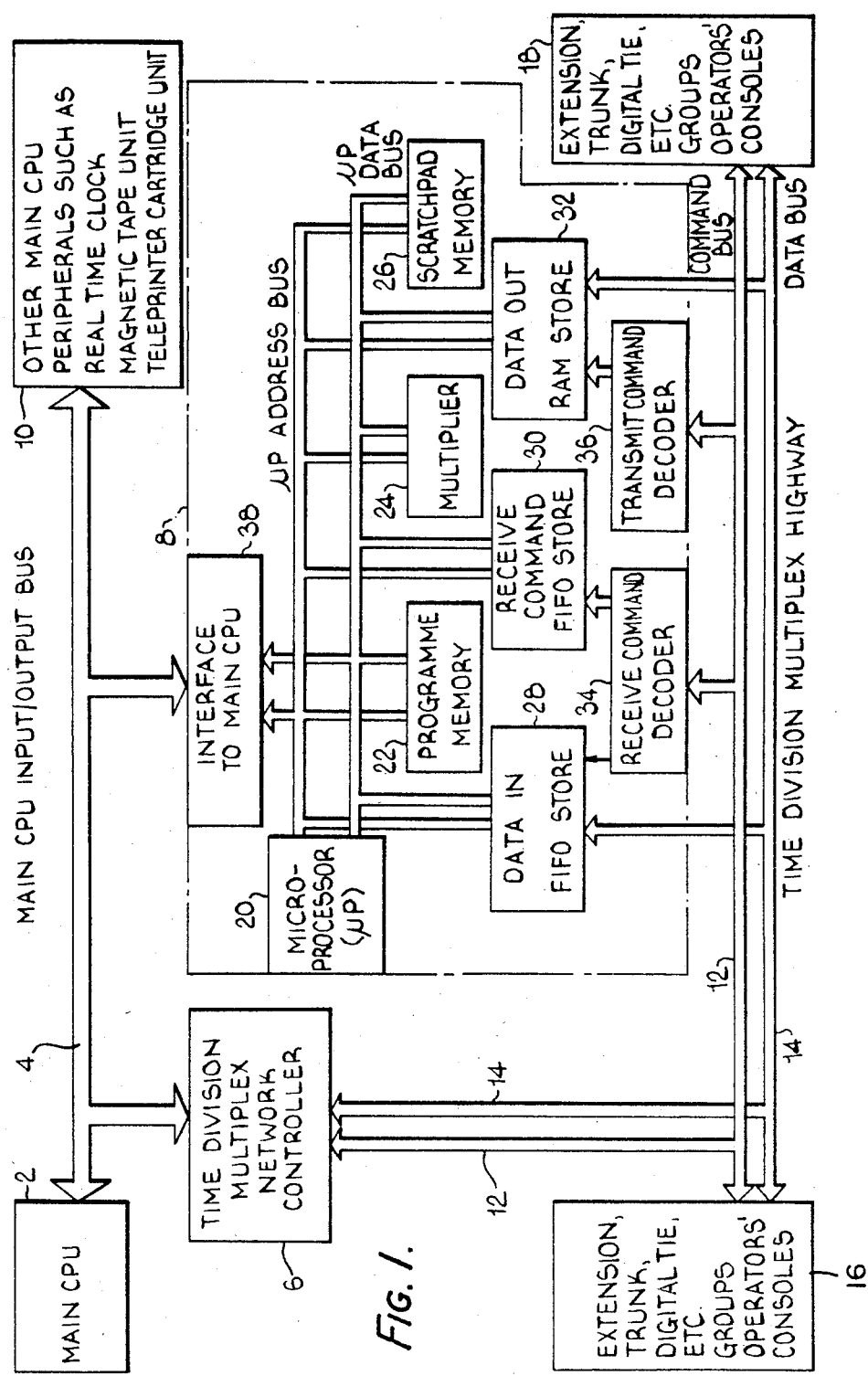
FIG. 1 shows a block diagram of the control circuitry of a digital telecommunication exchange according to the present invention.

Referring now to the drawing, the control system for a digital telecommunications exchange according to the present invention comprises a main central processing unit (C.P.U.) 2 which is connected via an input/output bus 4 to a time division multiplex network controller 6, to a signal pre-processor 8 hereinafter referred to as the FSP 8, and to other main C.P.U. peripherals such as real time clock, magnetic tape unit, teleprinter or cartridge units indicated at 10.

The T.D.M. network controller interfaces signals between the main C.P.U. bus 4 and the command bus 12 which controls the passage of information on the data bus 14.

The main C.P.U. 2 makes all initial decisions, e.g., which extension shall be connected to which other extension and in which time slot. Then, the main C.P.U. puts out command words to various parts of the system including the T.D.M. network controller. The command words are received from the main C.P.U. and are held in the T.D.M. network controller 6 so that the T.D.M. network controller controls the transfer of information in the network (hence the term "network controller") without the necessity of constant reference back to the main C.P.U.

The time division multiplex network controller communicates with the main CPU via the main CPU input-output bus. Commands issued by the main CPU to the TDM network controller are stored in the controller and are output repetitively to the TDM multiplex highway on the command bus. Each command is output once in every TDM frame. Thus a regular sequence of commands, repeating at the TDM frame rate, is output by the TDM controller onto the TDM command bus.

In response to these commands, a selected extension trunk, digital tie, etc group, operator console, FSP or the TDM controller is responsive to output speech samples, tone samples or status information,—according to the command,—onto the TDM multiplex highway data bus. Thus a regular sequence of speech samples and tone samples status information is passed between extension, trunk, digital tie groups, TDM controller, FSP, operator's consoles, along the multiplex highway data bus.

In response to the commands on the TDM command bus, extension, trunk, digital tie etc groups, FSP, TDM controller and operator console receive the speech samples, tone samples or status information from the TDM Data Bus. In this manner information is passed between extension, trunk, digital tie etc groups, FSP, TDM controllers, and operator consoles.

The time division multiplex network controller 6 is connected to the FSP 8 by a command bus 12 and a data bus 14, which buses are also connected to extension, trunk, or digital tie lines or to subsriber' groups and operator consoles as indicated at 16 and 18.

The FSP 8 contains a microprocessor 20, a programme memory 22 a multiplier 24, a scratchpad memory 26, a data-in store 28, a receive command store 30, a data-out store 32, a receive command decoder 34, a transmit command decoder 36 and an interface 38 to the main C.P.U. 2.

For each function performed by the FSP 8, the FSP Programme Memory 22, holds an algorithm. The algorithms may be for multifrequency (MF) tone decoding, dial pulse decoding, out pulse generation, tone generation and conference call summations. The algorithms may use the Multiplier 243, the scratchpad memory 26 and the internal functions of the micro-processor during the execution of the algorithms.

Datum words required by an algorithm are input to the FSP 8 from the time division multiplex highway (TDM) data bus 12 under the control of receive command issued by the TDM Network Controller on the command bus and decoded by the receive command decoder 34. The datum words may be speech samples, MF tone samples or dial pulse samples. The words are stored in sequence in the data-in first-in first-out (FIFO) store 28.

The receive commands are stored in sequence in the receive command FIFO store 30.

Datum words which are destined for telephoning equipment, for example extension groups, trunk groups, digital tie groups, operators' consoles are stored by the algorithm in the data-out random access memory (RAM) store 32. The datum words are output onto the TDM data bus under control of transmit commands issued by the TDM network controllers.

The main CPU 2 selects an algorithm to be implemented in response to the conditions existing in the telephone system e.g. extension goes off-hook, dial tone required. The CPU 2 allocates a channel number and an algorithm to it and sends this information to the FSP 8 via the main CPU input/output (I/O), bus 4 and the FSP interface 38 to main CPU 2. The FSP 8 stores this information in the scratchpad memory 26. The main CPU 2 instructs the TDM network controller 6 to put the relevant receive and/or transmit commands on the TDM command bus 12. The receive and transmit commands contain the channel number allocated by the main CPU 2.

Figure 2:
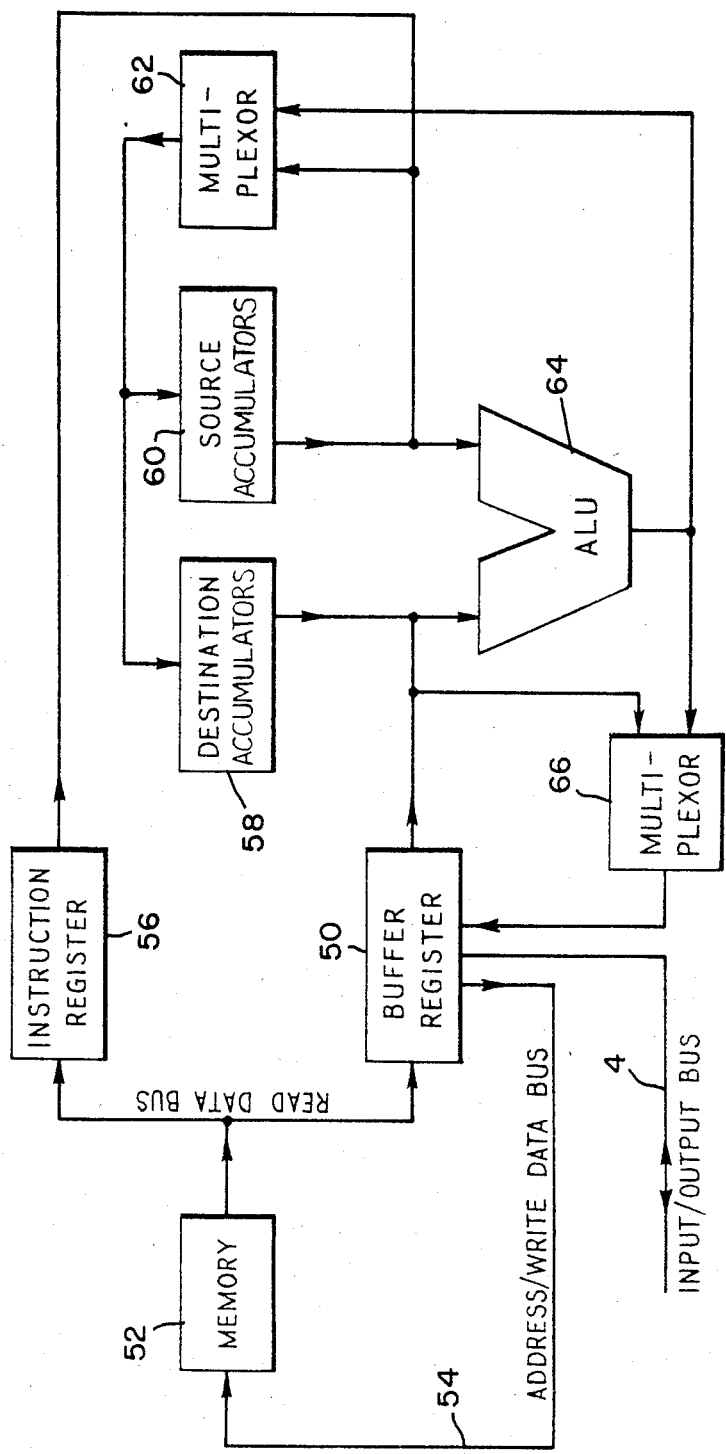
FIG. 2 shows in block diagram form the central processing unit of FIG. 1.

The main C.P.U. 2 (FIG. 2) comprises a buffer register 50 connected to the input/output bus 4. The buffer register can output signals to the memory 52 via an address/write and data bus 54. All connections shown are busses, but for simplicity they are drawn as a single line with arrows indicating the direction in which the signals travel.

The memory 52 is connected to an instruction register 56 and to the buffer register 50 so that the memory 52 can output instructions on the input/output bus 4. The instruction register stores signals outputted from the memory and transfers these signals to a source accumulator 60 and a destination accumulator 58 via a multiplexor 62 which can also pass information from an arithmetic logic unit (A.L.U.) 64. The A.L.U. 64 is able to process signals from register 50 and accumulators 58; and from accumulators 60 and register 56 to produce an output signal which can be transferred onto bus 4 via a multiplexor 66 and buffer.

Figure 3:
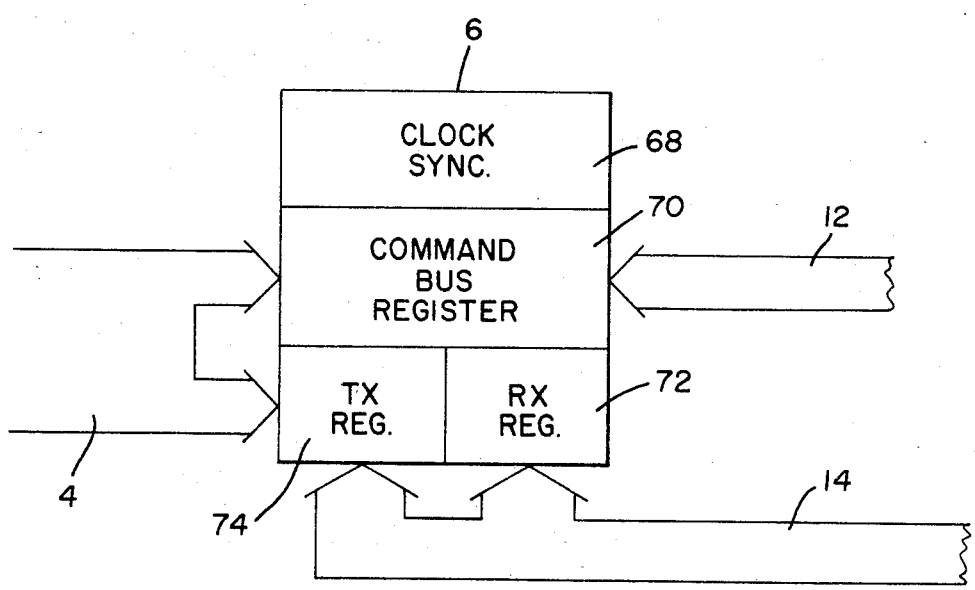
FIG. 3 shows in block diagramatic form the time division multiplex network controller of FIG. 1, FIGS. 4a and b when assembled together show a flow diagram of a routine for off hook scanning within the central processing unit (CPU), FIGS. 5a and b when assembled together show a flow diagram of a routine for detection of completion of dialling within the CPU.

The bus 4 is connected to the TDM network controller 6 (FIG. 3) which comprises a clock synchronising circuitry 68. This maintains the synchronism of the controller 6 and also the data and command functions on the busses 12 and 14 with the central processor. A command bus register 70 stores the addresses of parts of the system accessible via the command bus 12, which addresses are inserted in the register 70 under the control of the central processor 2. Information input on the data bus 14 as a result of any command address is received by the controller 6 in a receive register 72 and is transferred to a transmit register 74 from which it can be transmitted to a further address on receipt of a command from the command bus register 70. Also, data present in the transmit register 74 can be transmitted to the main processor 2 on receipt of an appropriate command from the main processor.

Thus the controller 6 controls the passage of data along the bus 14 from a source to a chosen destination under instructions previously received from the main processor whilst leaving the main processor free to access other parts of the system.

The TDM network controller 6 places the receive and/or transmit commands on the TDM command bus 12 periodically so that the FSP 8 receives commands and datum words for a particular channel at the frame rate of the TDM network. All processing or generation of datum words for a set of algorithms is completed within one TDM network frame.

The FSP programme memory 22 holds a supervisory algorithm which allocates the sequence in which functional algorithms are performed according to the receive command at the output of the receive command FIFO store 30 and the transmit commands held in the scratchpad store 26.

The main CPU programme memory is organized as a series of tasks. Each task is dedicated to a particular function e.g. scanning an extension for an "off hook"

condition. The order in which the set of tasks is performed makes up the overall control of the telephone system.

Figure 4A:
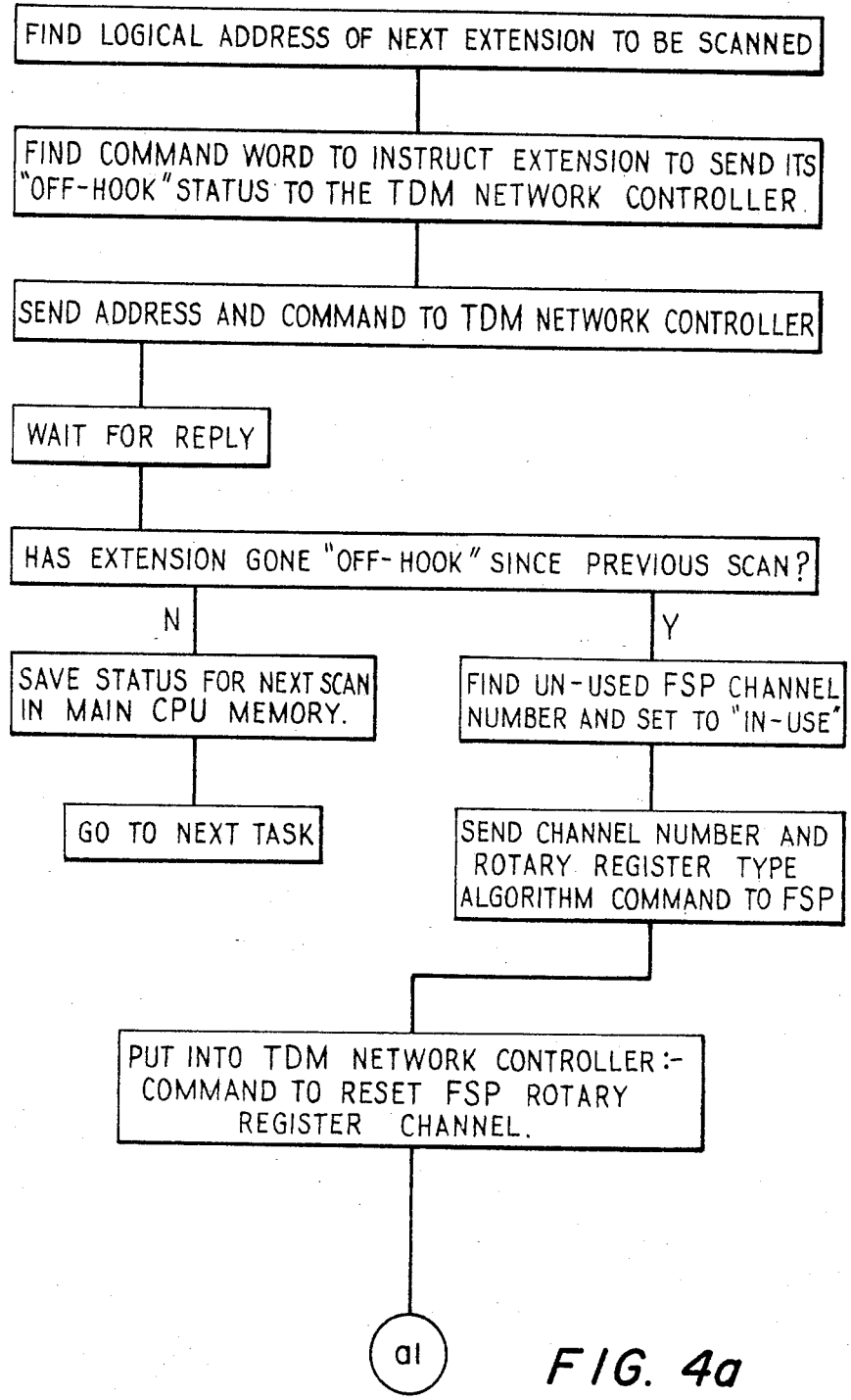
Figure 4B:
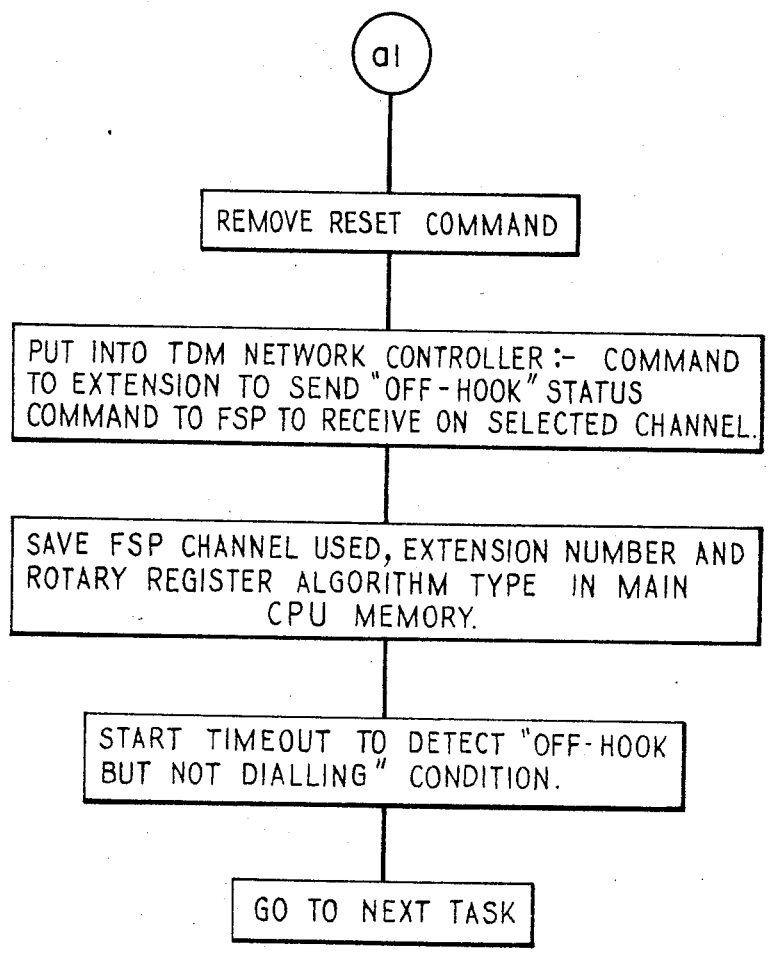

Two examples of such tasks are given. The first task (FIG. 4) scans a particular extension to find whether or not the extension has changed status from "on hook" to "off hook" since the extension was last scanned. If such a change has not happened, then the status is stored in main CPU memory for the next scan of this extension. If such a change has happened then a free FSP channel number is found, the command for a rotary register algorithm is selected and both sent to the FSP. The extension is sending its "off hook" status signal, and the TDM network controller is sent a command to enable the FSP to receive the "off hook" status data on that particular channel. The FSP channel used, and rotary register algorithm are stored in CPU main memory for this extension scanned. A timeout is begun to detect "off hook but not dialling" condition.

Figure 5A:
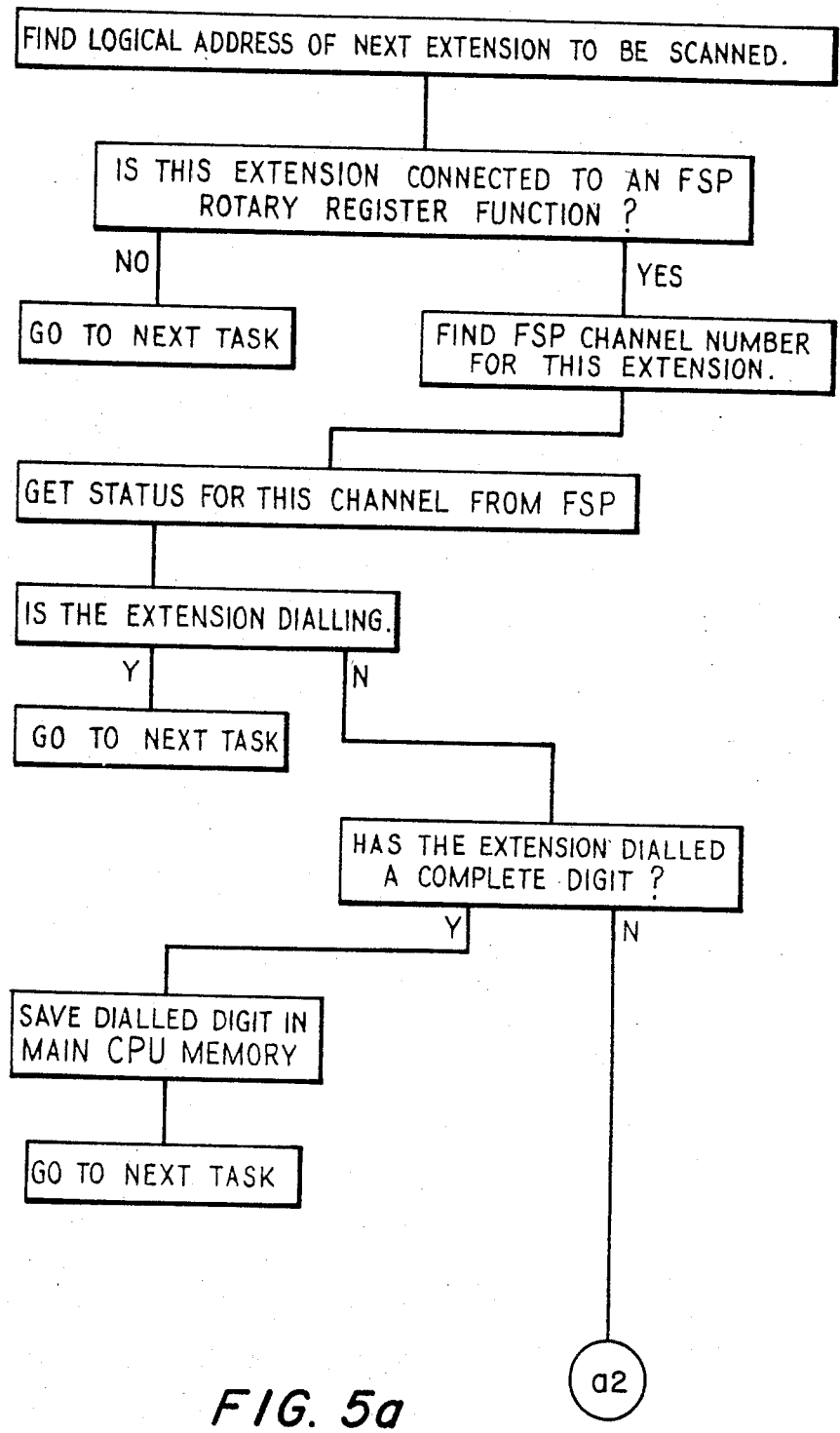
Figure 5B:
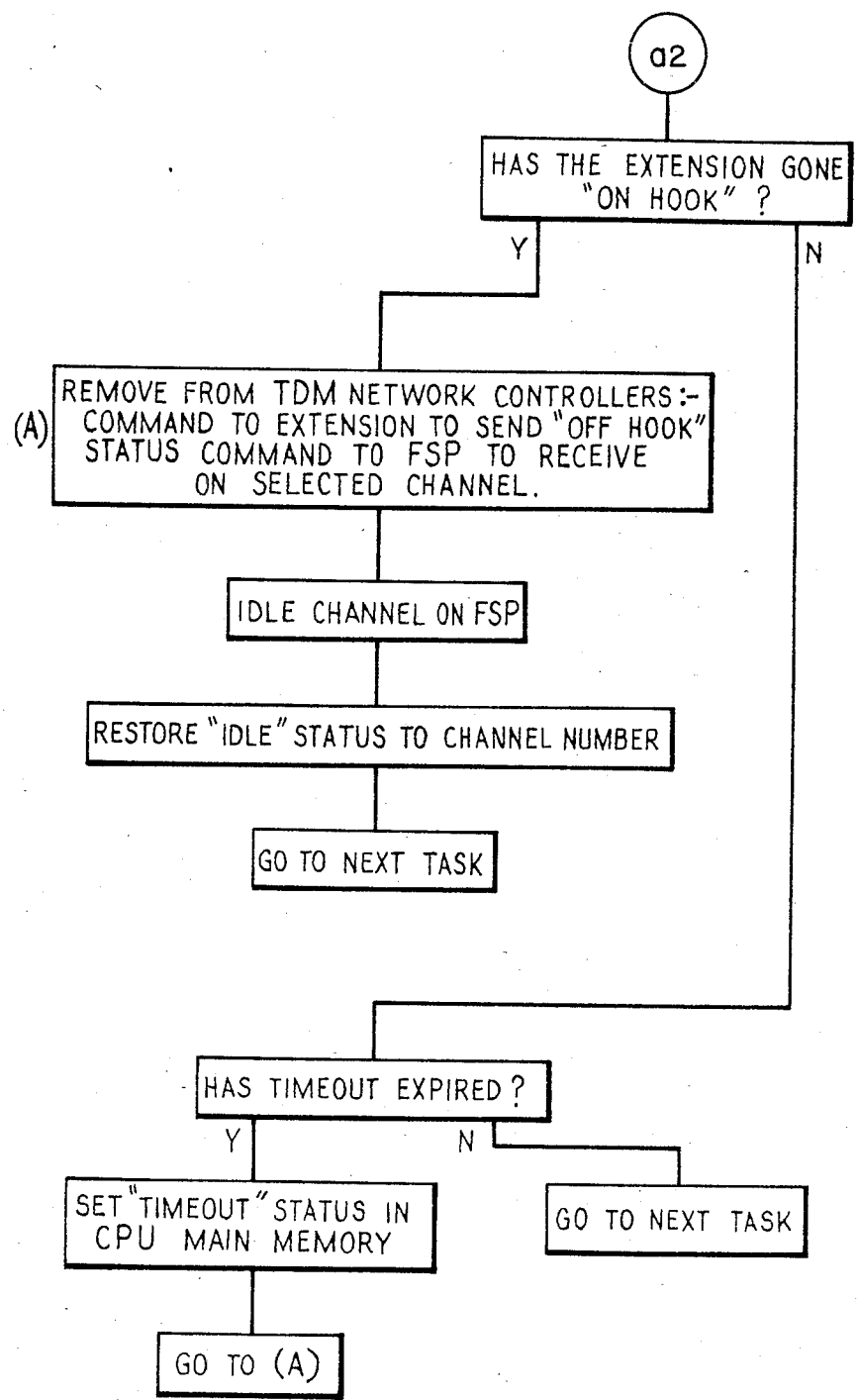

The second example (FIG. 5) determines whether or not an extension has finished dialling. Firstly the task finds the next extension number to be examined. If this extension is not connected to the FSP rotary register function then this task is finished. If the connection is made then the task finds the allocated channel number—held in main memory—and asks status information from the FSP for this channel. If the extension is still dialling this task is finished. If the extension has completed dialling a digit then the dialling digit is saved in the main memory and this task is finished. If the extension has gone "on hook" then the commands in example 1 in the TDM network controller are removed, the FSP idled for this channel, the channel number set to "not in use" in the main memory and this task is finished. If the extension is "off-hook" then the 'timeout' is examined and if true 'timeout' status is set in main memory. This task is now complete.

Figure 6:
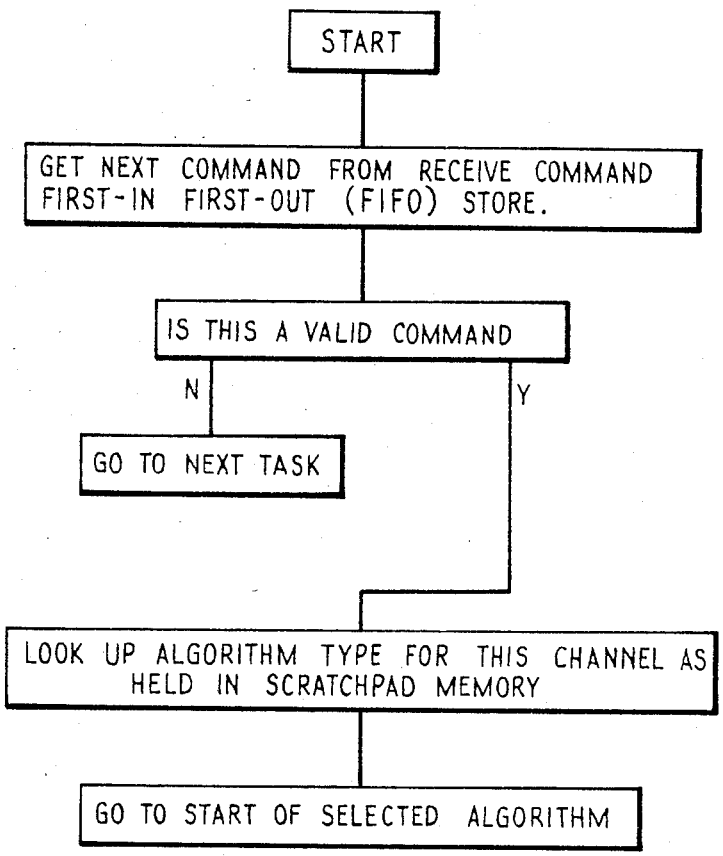
FIG. 6 shows a flow diagram of a routine for allocating the next algorithm within the programme memory in the signal pre-processor (FSP).
Figure 7:
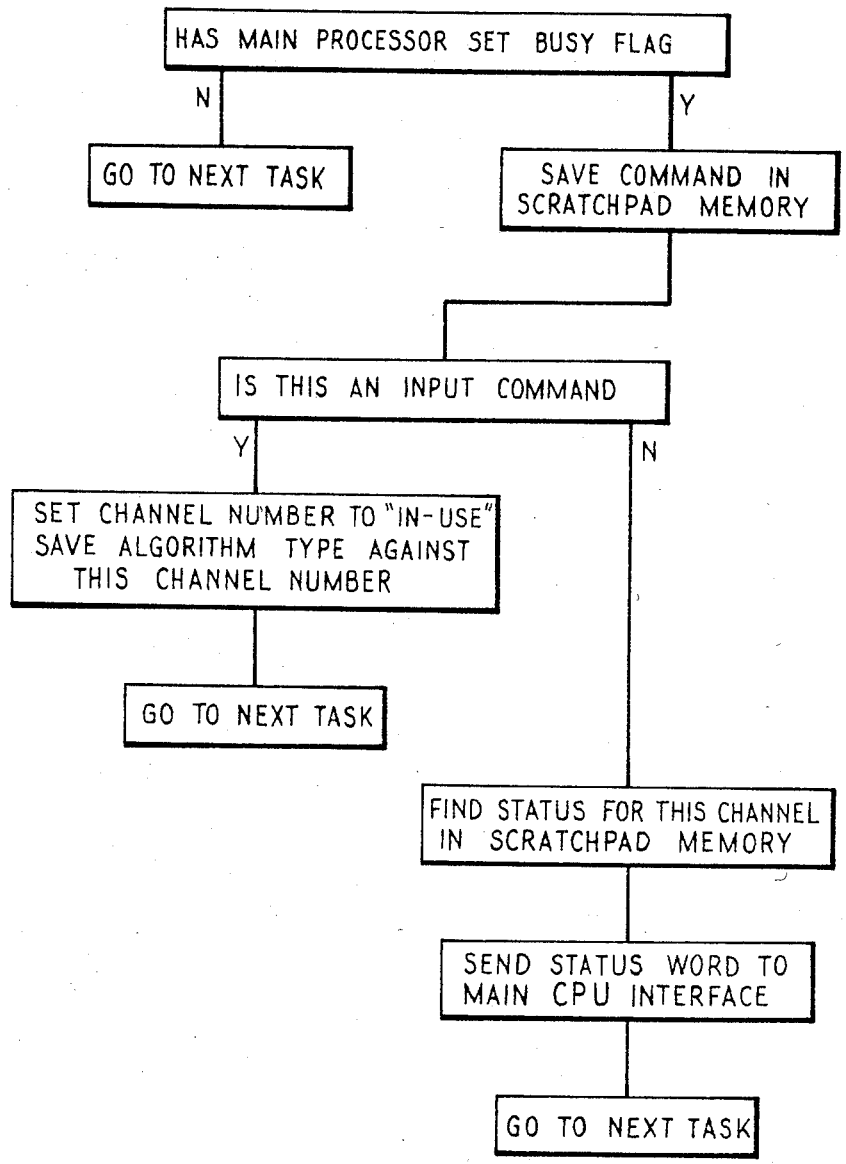
FIG. 7 shows a flow diagram of a routine for communication with the main CPU within the programme memory in the FSP.

The routines stored in the programme memory of the FSP 8 are shown in FIGS. 6 and 7.

Figure 8:
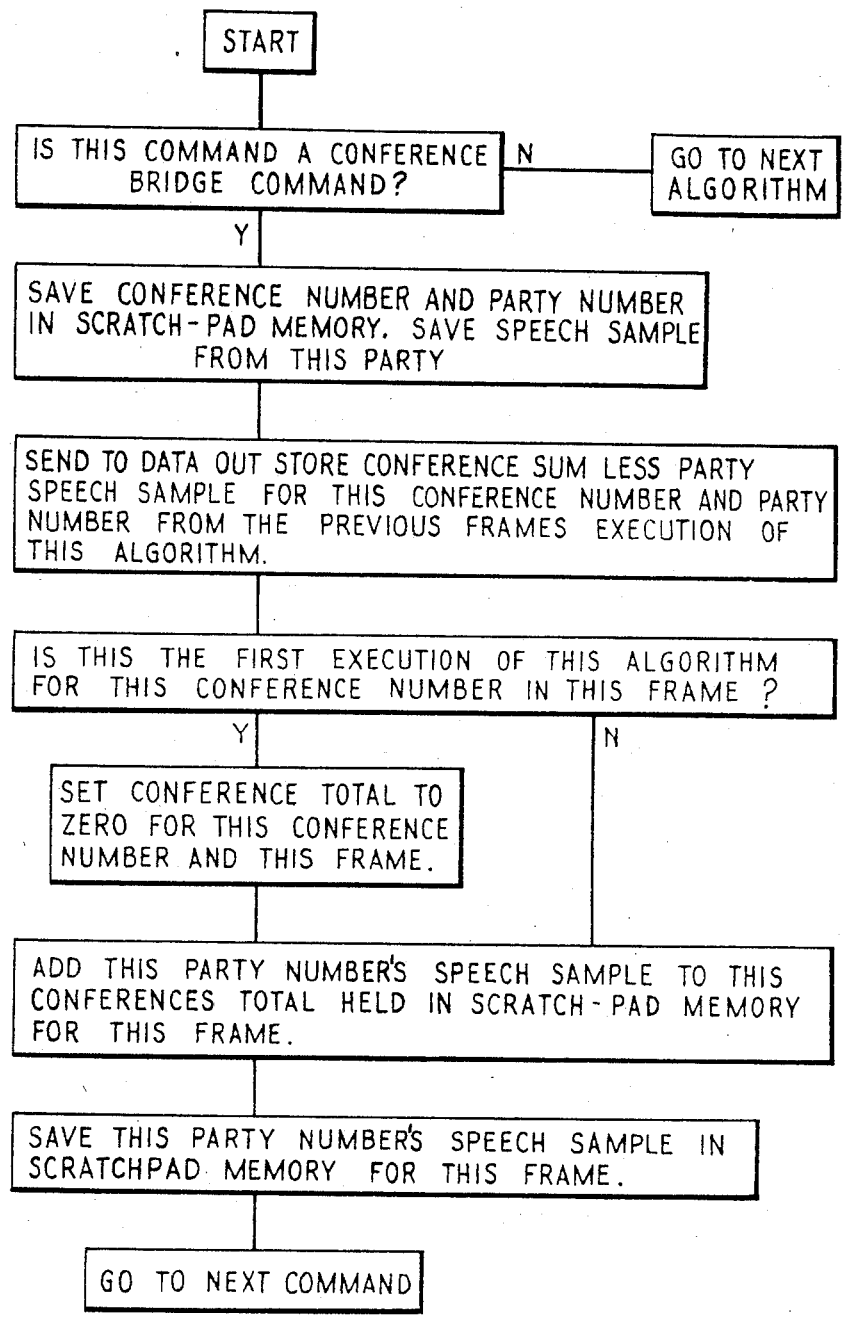
FIG. 8 shows a flow diagram of an algorithm for conference calls within the programme memory in the FSP, FIGS. 9a and b when assembled together show a flow diagram of an algorithm for tone generation within the programme memory in the FSP.
Figure 9A:
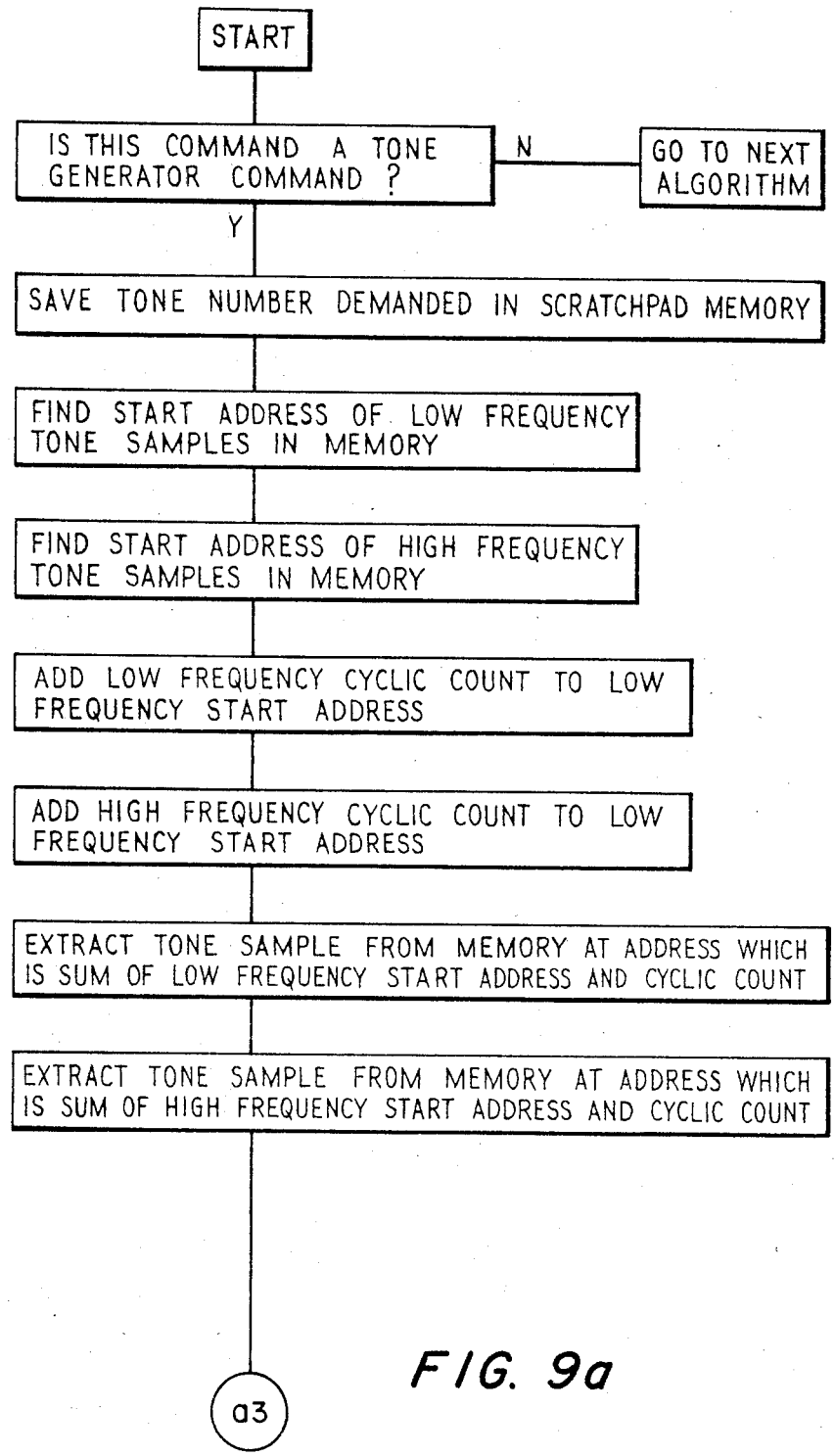
Figure 9B:
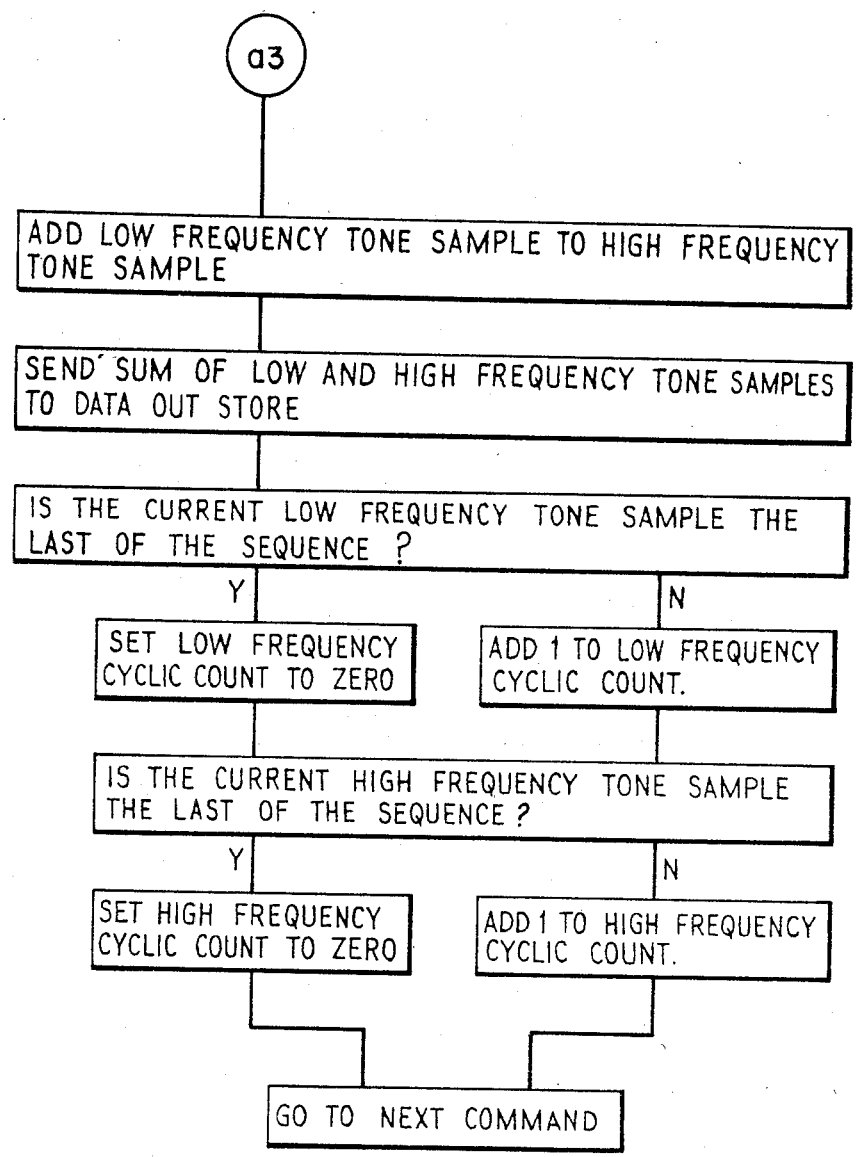
Figure 10:
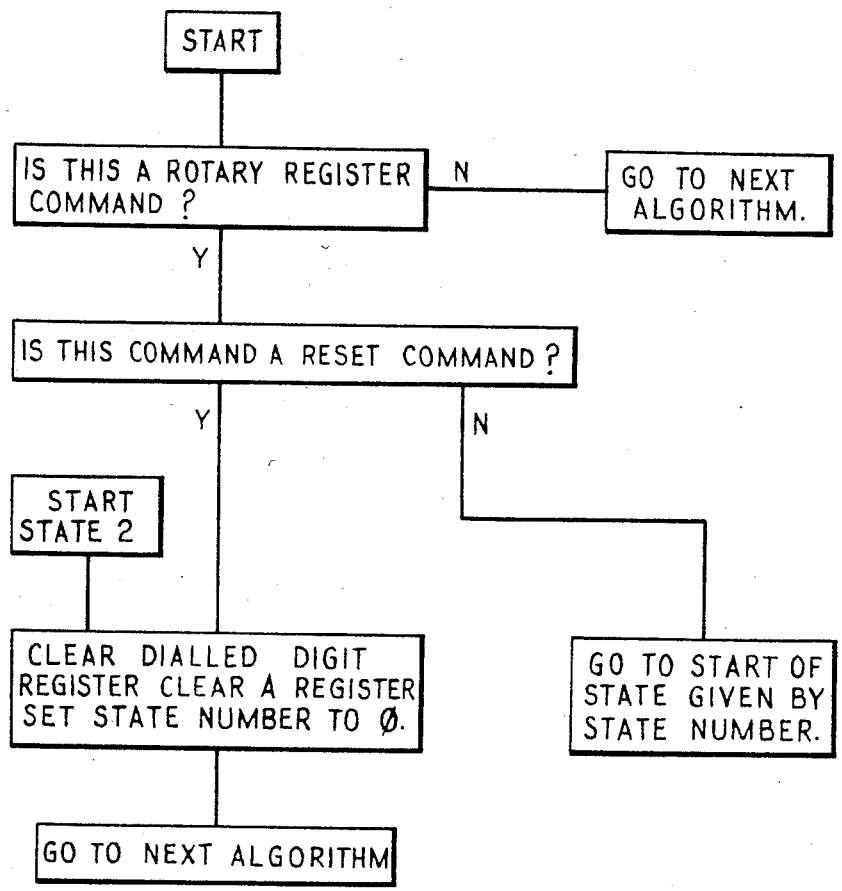
FIG. 10 shows a flow diagram of an algorithm for the selection of rotary register functions within the programme memory in the FSP and, FIGS. 11 to 17 show flow diagrams for algorithms within the selection of rotary register functions respectively for start states $\phi$ and 1 through to 6.
Figure 11:
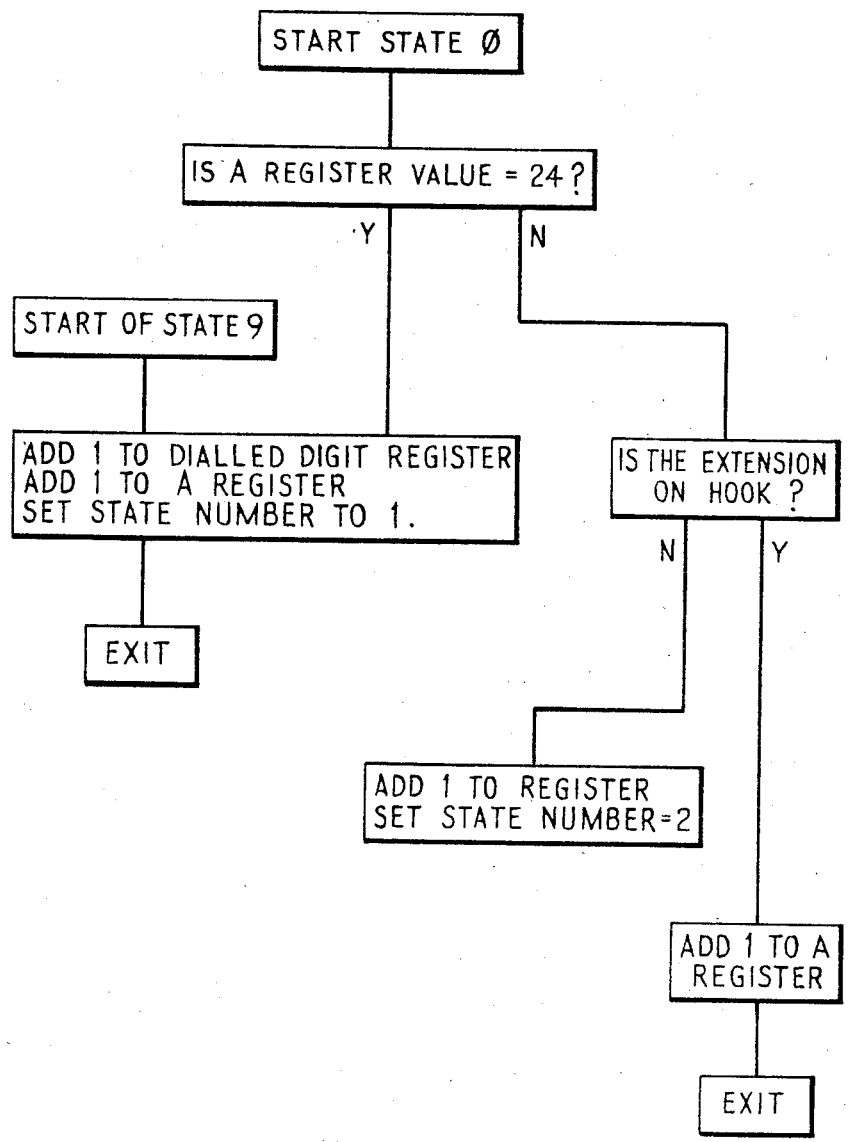
Figure 12:
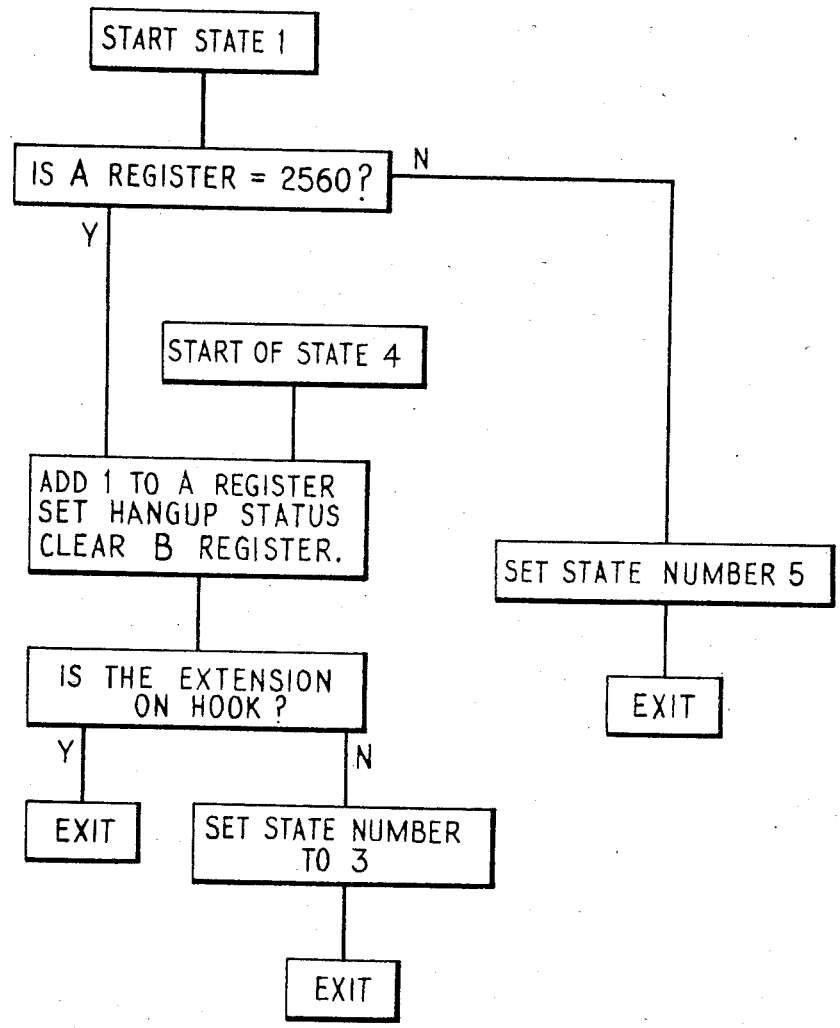
Figure 13:
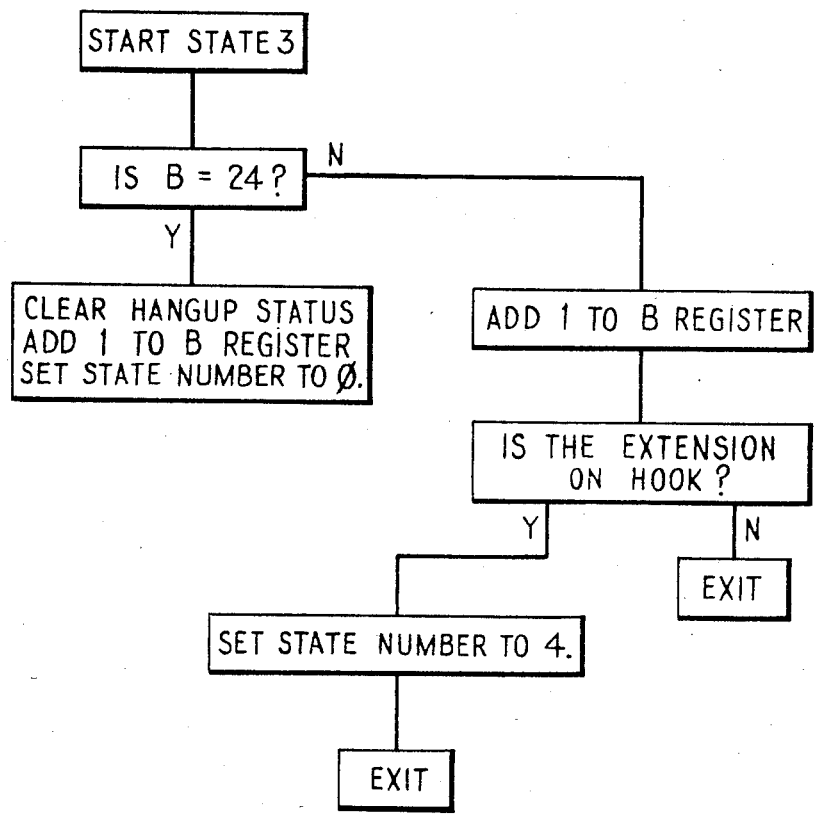
Figure 14:
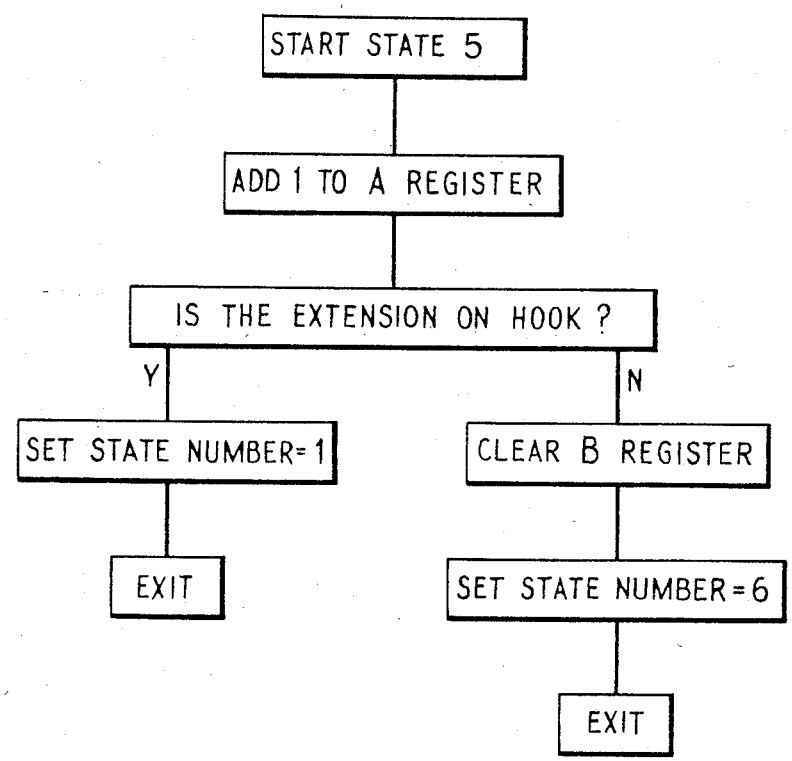
Figure 15:
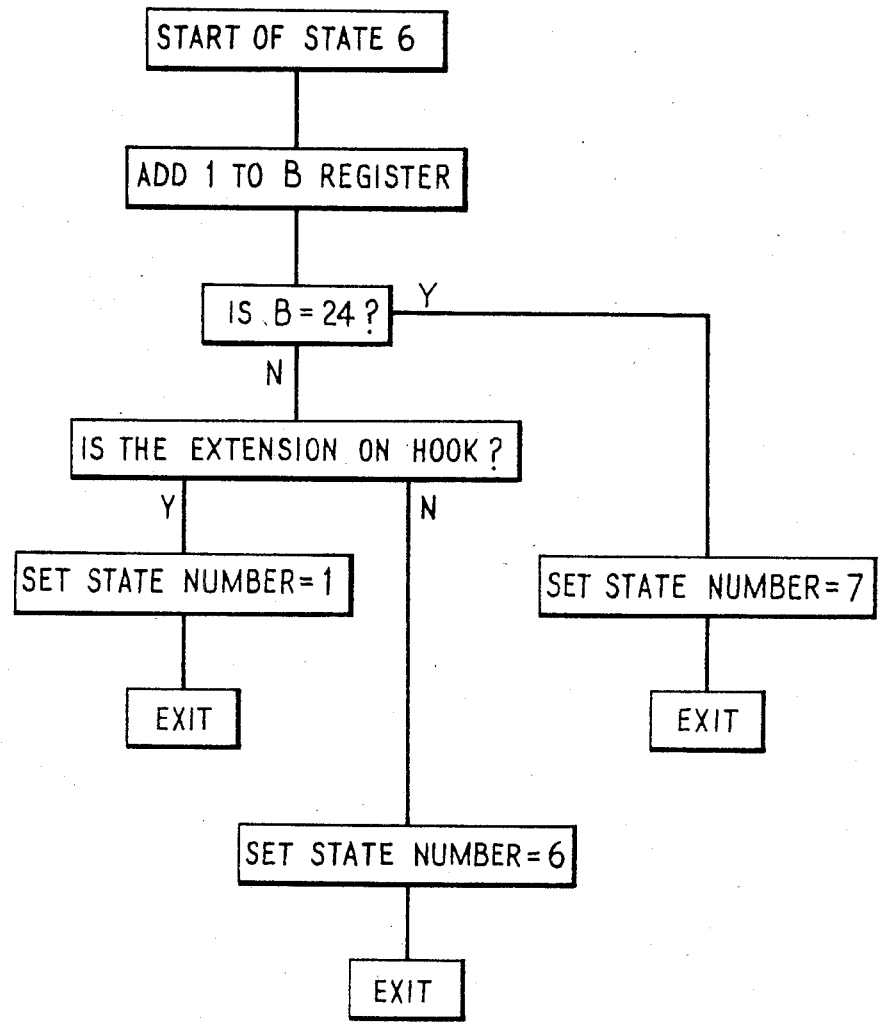
Figure 16:
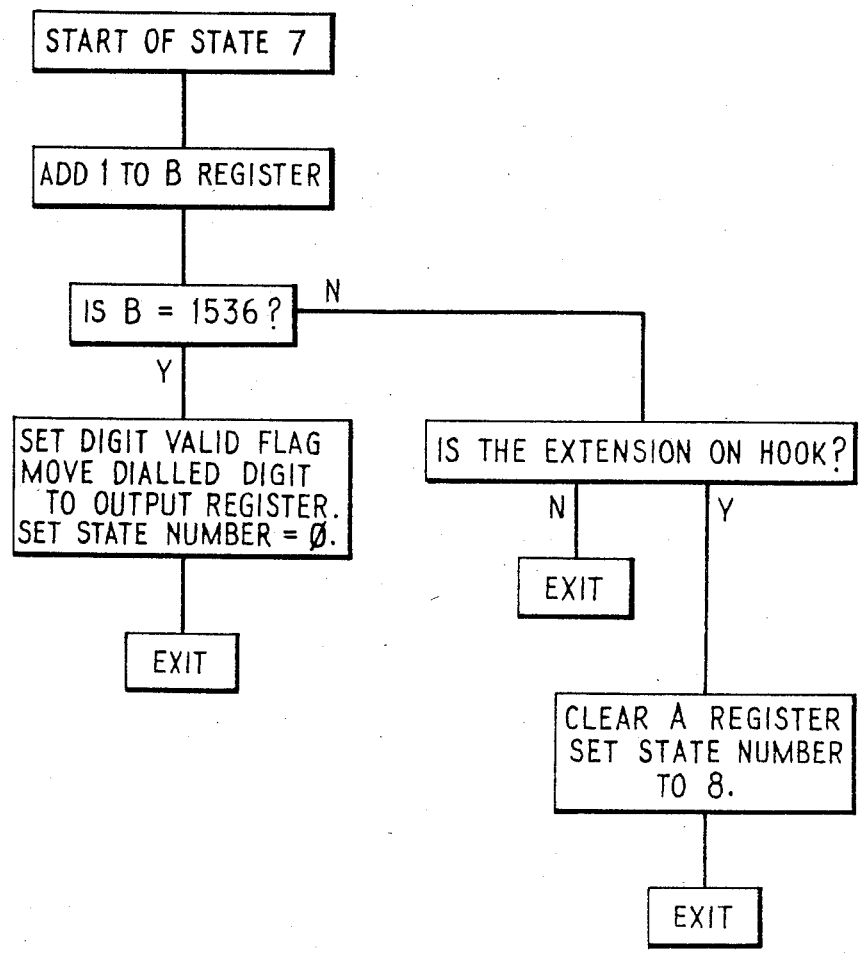
Figure 17:
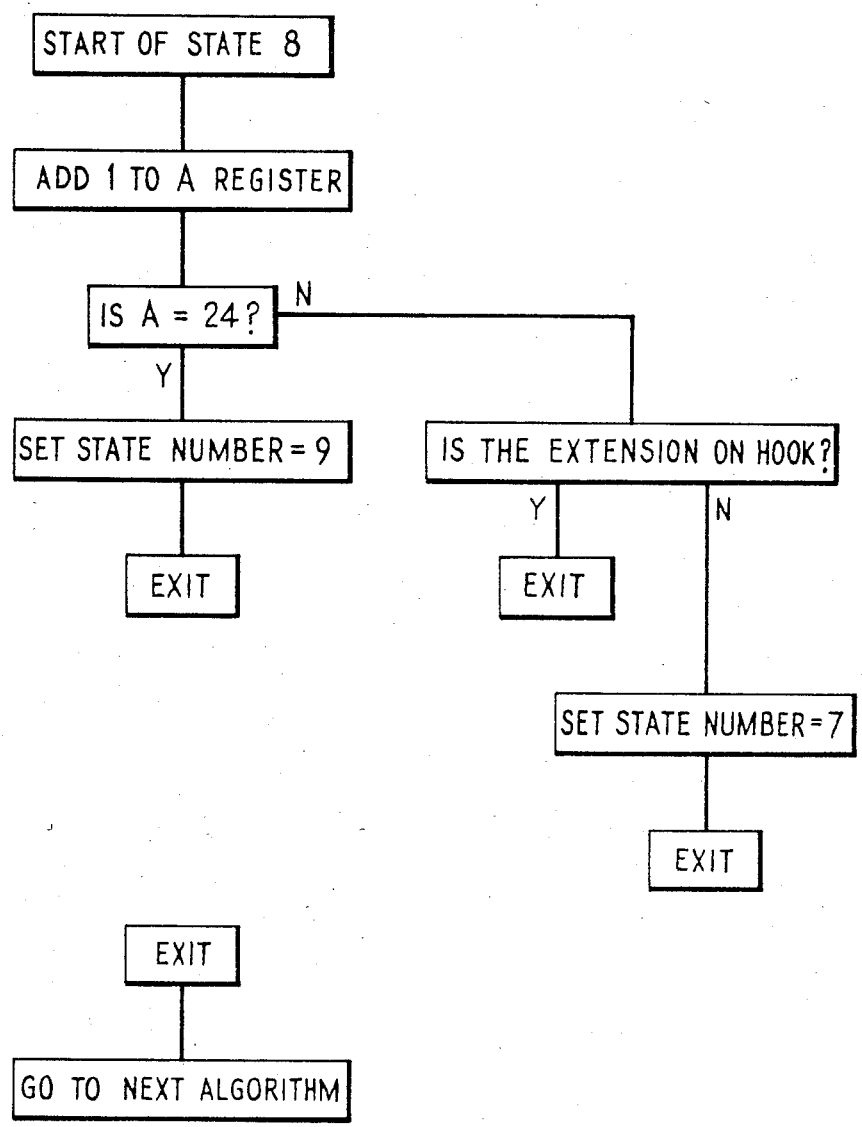

FIG. 6 shows the routine followed in deciding on an algorithm to be selected in dependence on the channel used by the incoming signal. The selected algorithm may be one of a number of which two are exemplified in FIGS. 8 and 9. FIG. 7 shows the routine which determines when the CPU is required to be communicated with. FIG. 8, as described shows the algorithm for conference bridge calls and FIG. 9 for connection of respective tone generation signals.

FIGS. 10 to 17 show flow diagrams for algorithms concerned with rotary register functions. These determine the status of a call during the set up procedure and are concerned with the detection of dialled digits if present and the disconnection or discontinuance of the dialling procedure.

The following is an example of overall system operation.

The example is of an extension going off hook, dialling a number and being connected to the called party.

Extension A goes offhook.

Extension scanning task finds A off hook and records this status in main memory.

Dial tone allocating task finds off hook status for extension A and connects dial tone to extension A by allocating an FSP channel to a tone generator algorithm and connects the extension to the FSP.

Rotary register allocating task finds off hook status for extension A and connects a rotary register to extension A by allocating an FSP channel to a rotary register algorithm and connects the extension to the FSP.

Extension A dials sequence of digits.

Rotary Register scanning task finds, in turn, each digit dialled by examining the FSP rotary register channels. Each digit is stored in main memory.

The dialled digit scanning task finds the first digit dialled by extension A and removes dial tone by deactivating the FSP channel and disconnecting the FSP to extension connection.

The completion of dialling task finds that extension A has completed dialling and attempts to connect A to the called party—B say. If called party B is busy then busy tone is returned to extension A using the FSP and a tone generator algorithm. If B is not busy then Extension B is rung and ringing tone is returned to extension A using the FSP and a tone generator algorithm.

Extension B goes off hook.

Extension scanning task finds B off hook and records this status in main memory.

Call connection task finds B off hook, removes B's ringing, removes ringing tone to A by deactivating FSP channel and disconnecting the FSP to extension connection, and connects A to B.

We claim:

1. A digital telephone exchange including:
a central processing unit,
a signal pre-processor,
a first bus forming a two-way connection between said central processing unit and said signal pre-processor,
a time division multiplex highway system including a command bus and a data bus,
said signal pre-processor being connected both to said command bus and to said data bus,
subscribers' apparatus connected to said time division multiplex highway system and to said first bus,
a time division multiplex network controller connected to said first bus, and to said command bus and said data bus, said time division multiplex controller including a command bus register for storing the addresses of sources and destinations for data transferred by said data bus, said addresses being input into said command bus register from said central processing unit,
said central processing unit including a first memory in which a number of tasks are recorded, said tasks performing the interrogation of the status of the subscribers' apparatus, and allotting a time slot for said signal pre-processor for operation on signals from a subscriber connected to said subscribers' apparatus, said signal pre-processor including a second memory in which a number of algorithms of routines are recorded, said algorithms being actuated by said central processing unit, for operation on signals received from the subscriber, during the course of a task performed by said central processing unit, in which each algorithm consists of a number of datum words each of which is processed by the signal pre-processor during the time period of a single time division multiplex frame period.

2. A digital telephone exchange as claimed in claim 1, in which the signal pre-processor comprises a microprocessor which is connected by a pre-processor address bus and a pre-processor data bus to
(a) a program memory holding said number of algorithms, (b) a scratch pad memory for use by the microprocessor,
(c) a data-in first-in first-out store,
(d) a receive command first-in first-out store, and,
(e) a data-out random access memory store, in which a receive command decoder is connected to said receive command store and a transmit command decoder is connected to said data-out random access memory store; said receive command decoder, said data-in first-in first-out store and said data-out random access memory store being connected to a time-division multiplex highway to which subscribers' lines, trunk lines and digital tie lines are connected, said time-division multiplex highway comprising a command bus and a data bus, the latter data bus being connected to the data-in first-in first-out store and the data-out random access memory store and the latter command bus being connected to the receive command decoder and the transmit command decoder.

3. A digital telephone exchange as claimed in claim 1 in which the time division multiplex network controller is connected both to said command bus and said data bus of said time division multiplex highway system and to the first bus connecting said central processing unit to said signal pre-processor.

4. A digital telephone exchange as claimed in claim 1 including a plurality of peripheral units connected to the first bus connecting said central processing unit and said signal pre-processor.

* * * * *